Oct. 26, 1965 J. LICHTENSTEIN 3,214,350
FALLING FILM STILL

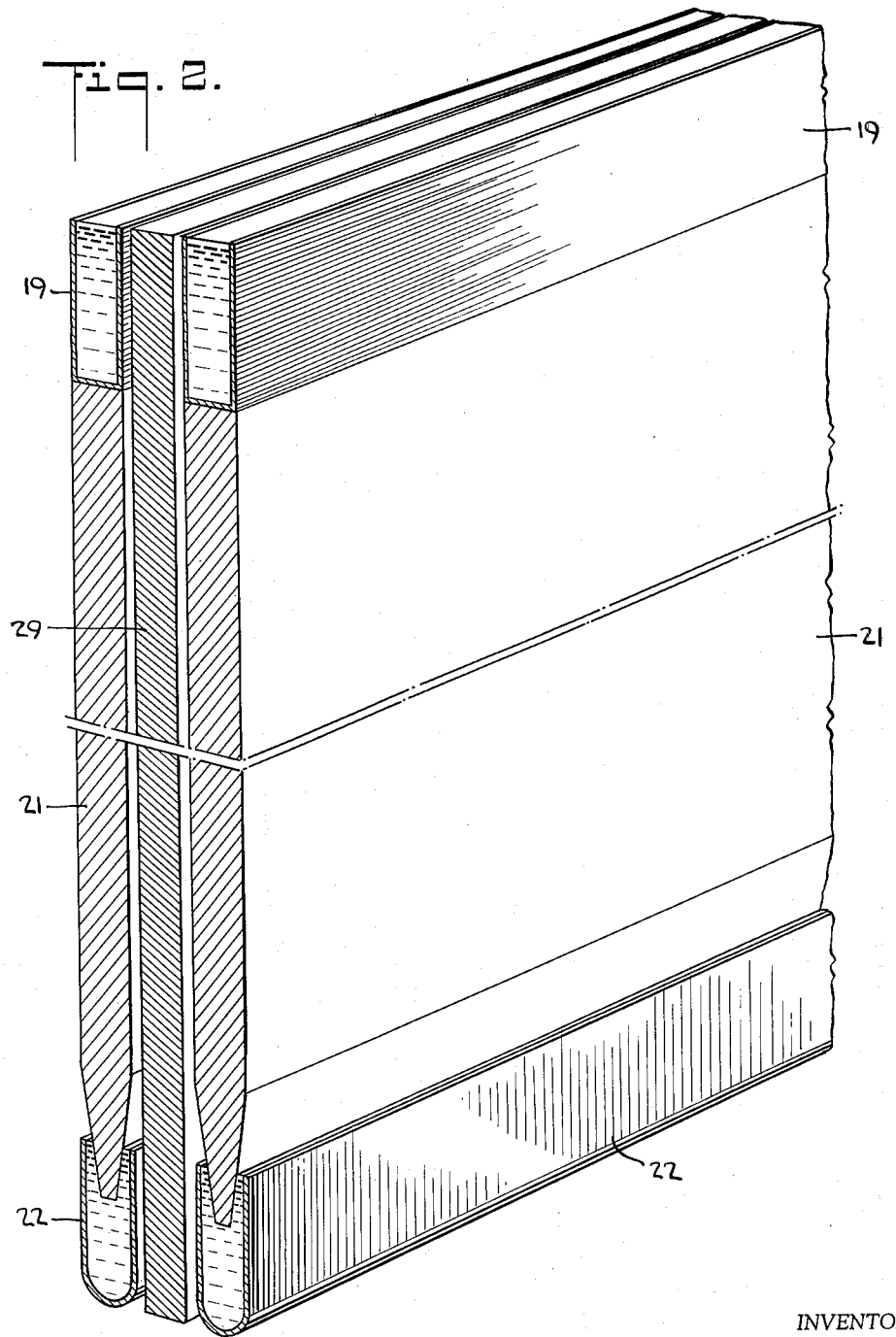

Filed Nov. 27, 1962 4 Sheets-Sheet 3

INVENTOR.
JOSEPH LICHTENSTEIN
BY
Ward, Neal, Haselton, Orme & McElhannon
ATTORNEYS Oct. 26, 1965 J. LICHTENSTEIN 3,214,350
FALLING FILM STILL
Filed Nov. 27, 1962 4 Sheets-Sheet 4
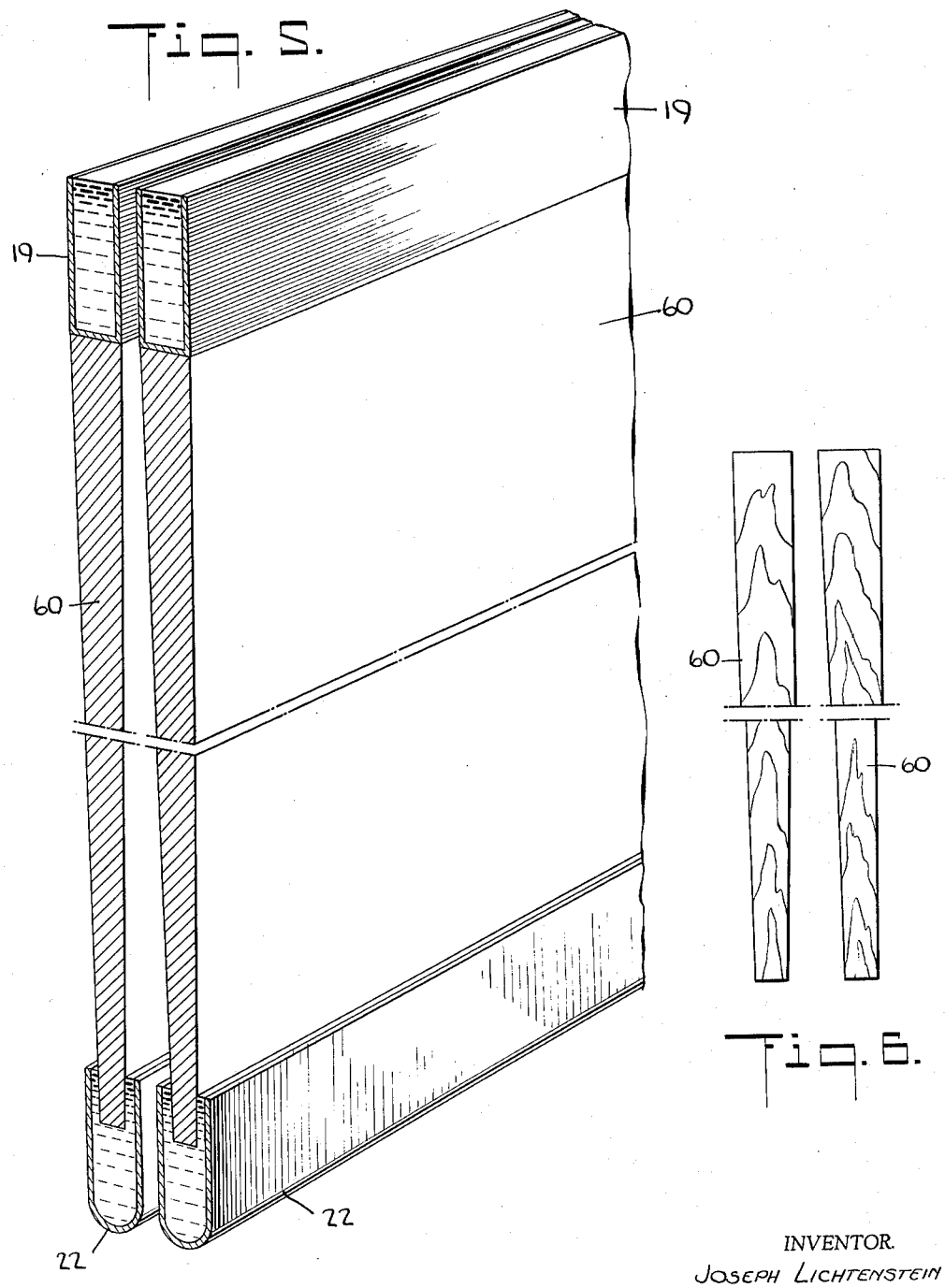
INVENTOR.
JOSEPH LICHTENSTEIN
BY
Ward, Neal, Haselton, Orme & McElhannon
ATTORNEYS

United States Patent Office 3,214,350
Patented Oct. 26, 1965

3,214,350
FALLING FILM STILL
Joseph Lichtenstein, Bayside, N.Y., assignor, by mesne assignments, to Saline Water Conversion Corporation, a corporation of New York
Filed Nov. 27, 1962, Ser. No. 241,465
23 Claims. (Cl. 202—64)

This is a continuation-in-part of my co-pending application Serial No. 191,189 filed April 30, 1962, now abandoned and entitled "Conversion of Saline Water."

This invention relates to solvent recovery, and more particularly, to the concept embodying a method and apparatus for extracting a solvent from a solvent system containing dissolved non-volatile substances. One of the more important applications for the present concept resides in the extraction of potable fresh water from sea or brackish water; and in connection with this application, either water of practically zero salinity may be produced according to the present invention, or the same apparatus may be used to produce potable water of a specified salinity.

While the present specification will be directed towards the recovery of potable fresh water from saline or brackish water, it will be appreciated by those persons skilled in the art that the instant concept may readily be applied for the recovery of other solvents from solvent systems containing dissolved non-volatile substances. Much effort has been and is presently being expended in the development of various methods and apparatus for effecting economical solvent recovery and particularly conversion of saline to fresh water. Among these are systems of a type generally known as flash systems wherein saline water for example is heated and flashed by pressure reduction to separate steam or vapor from the water. The steam or vapor thus produced is then condensed to form fresh water.

Actually, known flash systems present some very considerable problems. For example, in such systems saline water is heated in a vessel and is then suddenly introduced to a space of lower pressure, or the pressure in the water chamber is suddenly reduced, to effect sudden boiling. When there is a body of water contained in the vessel, its depth causes successive layers or strata of water below the surface to be subjected proportionally to hydraulic pressure. Since flashing occurs because of the pressure differential between the saturated pressure corresponding to the water temperature, which is the same for the whole body of water, and the actual pressure existing at each layer, the flash will be most violent at the surface which is cooled to the saturation temperature corresponding to the pressure existing in the chamber. Successive layers below the surface form rising bubbles and are cooled so that if the water is deep enough, the pressure of the lowest layers will reach the saturation pressure corresponding to the water temperature and will not flash at all, thus not contributing to the formation of vapor. In other words a full efficient utilization of the available thermal energy for vapor formation is impossible.

In addition, and depending upon the temperature differential of the flash, the upper layers release vapor at high velocity with the result that the vapor bubbles tear salt water droplets from the water surface and carry them along to the condenser where in the condensation process the fresh water product becomes contaminated with salt.

To prevent this contamination the wet steam must be dried in costly separators whose required pressure drop reduces the pressure at which condensation can take place and necessitates colder condensing water to convert the vapor into fresh water.

Additionally, such systems, because of the violence of flashing are difficult to control accurately, and since salts and the like are carried over to the condensate, corrosion and scaling are serious problems, particularly where the equipment is fabricated of steel.

I have conceived by my invention a novel method and apparatus that enables me to convert saline water, that is, sea or brackish water, to potable fresh water in a continuous, non-violent system wherein the vapor formed is substantially salt-free so that potable fresh water is produced without the need of separators.

Thus, my invention resides in a method and apparatus wherein the saline water to be converted is heated and then disposed to present a large surface area in the form of thin films confined in a limited vapor space of variable pressure so arranged that at each point on the water surface the saturation pressure corresponding to the water temperature nearly balances the vapor pressure at that point, thus limiting the vapor release velocity. As a consequence, instead of violent flashing, vapor so to speak diffuses into the surrounding space. Actually, the films are continuously flowing and the water does not completely vaporize, so that the remaining liquid carries away any salts and the like dissolved or suspended therein. The realization of a space in which the pressure characteristics as herein described exist may for example be accomplished either by means of a so-called plug or channel plate inserted between adjacent water films and so shaped that the channels formed between the water film and the surface of the channel plate have cross-sections permitting suitable vapor velocities for the increasing mass flow of vapor continuously added to the channed as vapor diffuses from the falling and cooling water film; or by utilizing adjacent and directly opposed water films by so shaping the path of the falling water over the film plates that the channels thus formed between the adjacent water films have cross-sections permitting suitable vapor velocities for the increasing mass flow of vapor continuously added to the channels as vapor diffuses from opposed adjacent falling and cooling water films.

Since the essence of my invention consists in the confinement of the evaporation in a channel of continuously decreasing equilbrium pressure, it is, of course, understood that any shape channel enabling such a decreasing pressure will fall within the scope of this invention.

It will be understood therefore that the present concept comprises the distribution of water in thin films and the confinement of the diffusing process in a suitable channel under controlled conditions. The arrangement of this system of channels may, for example, be formed by opposed adjacent film plates so by plugs positioned between opposed film plates which may be in a vacuum chamber of any desired shape depending on specific design conditions.

Thus, as a feature of my invention, I provide an exceedingly large surface area of water by utilizing a tower of the type shown and described in United States Letters Patent No. 2,760,764, for example, wherein a series of closely spaced film plates are provided having vertical surfaces, a thin film of water being made to flow down along these surfaces by gravity so that an exceedingly large total surface area of water is simultaneously and continuously presented while the tower itself is of relatively small overall volume.

In accordance with the present concept, the tower is enclosed in order to permit pressure control, and it will be noted that, although the saline water passing through the tower drops in temperature, the vaporization occurs at a very low pressure differential; that is, the pressure difference between the saturation pressure of the water corresponding to its temperature at any given point and the pressure of the atmosphere in the vicinity of the water at that point must be small, the latter pressure being only slightly lower than the former. The flow characteristic of the channel is selected in such manner that the pressure necessary to overcome the friction loss of the vapor moving through the channel plus the pressure of acceleration necessary to drive the vapor through the channel will equal the drop in saturation pressure corresponding to the temperature difference between the water entering and that leaving the channel. I therefore control the velocity of vapor release and provide in the channels a steady state condition of vapor by continuously removing vapor from the channels and condensing it into potable fresh water while vapor is continuously added to the channels at the same rate at which it is removed so that the present system involves continuous vapor diffusion; that is, the controlled, continuous, gradual and non-violent production of vapor, as distinguished from a flash system.

The absolute pressure established at the end of the channel which is essentially equal to the saturation temperature of the water leaving the channel, is imposed on this system by a condenser which I attach to the tower or evaporator which the system of channels represents. If the water entering the evaporator at a fixed temperature is to be cooled to the desired leaving temperature, it is evident that the condensing system comprising the condenser surface, the cooling water temperature and the mass flow must be properly interrelated so that by condensation of the vapor the desired pressure differential is created, which in this invention is then utilized for overcoming the selected pressure drop in the evaporation channels and for providing the kinetic energy to cause the vapor to leave the channels.

Another advantage of this invention resides in the possibility of a better utilization of the available pressure drop, if specific operating conditions make this pressure drop large. That is, recompression of the vapor may be effected prior to condensation to permit operation of the condenser at a higher saturation temperature so that the temperature of the cooling water may be higher and the efficiency of the system thereby increased. Thus, for example, the channels may be so formed as to represent nozzles in which excess pressure is utilized to accelerate the vapor to a high exit velocity. There may then be interposed between the evaporator and the condenser a diffuser in which the velocity is changed to pressure. Recompression may of course be accomplished by other means such as for example the use of steam jets to accelerate the vapor into the diffuser.

The invention so far described is meant to be applied to a diffusion system of distillation. Those familiar with the art will appreciate that in such a system, if the condenser cooling water is also used as the feed water for the towers, the heat is recirculated within the system, and the salt water heater needs to make up only the internal energy discharged in the warm brine and distillate plus any incidental heat losses that might occur. Greater output can be obtained if the total available temperature range between warm and cold water is divided in multiple effects rather than in a single effect. When the total available temperature range is large, both economy and efficiency will dictate multi-effect application. The tower channel system I have previously described equally requires multi-staging under these conditions, since from a practical standpoint the design of a channel capable of absorbing a very large pressure drop is limited. Thus system requirements and design requirements of my apparatus harmonize.

The diffusion system of distillation, to which my invention is particularly directed, is characterized by its ability to utilize low grade waste heat for raising the saline water temperature. An outstanding example of such low grade waste heat is the heat absorbed by the cooling water in the condenser of a power plant. My invention may therefore be adapted for the utilization of such waste heat, since by design, either in the form of single or multiple-effect, it represents a cooling tower for the power plant and would be designed essentially in the same manner even if a cooling tower only were specified, by eliminating the condensing system and the plugs from the evaporators.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 2 is a detail view of a pair of film plates with a plug therebetween to form vapor channels between each side surface of the plug and the adjacent film plate;

FIG. 5 is a detail view similar to FIG. 2 but illustrating a system of channels formed by directly opposing adjacent film plates; and FIG. 6 is an end view similar to FIG. 3 but illustrating the system of FIG. 5.

Figure 1:
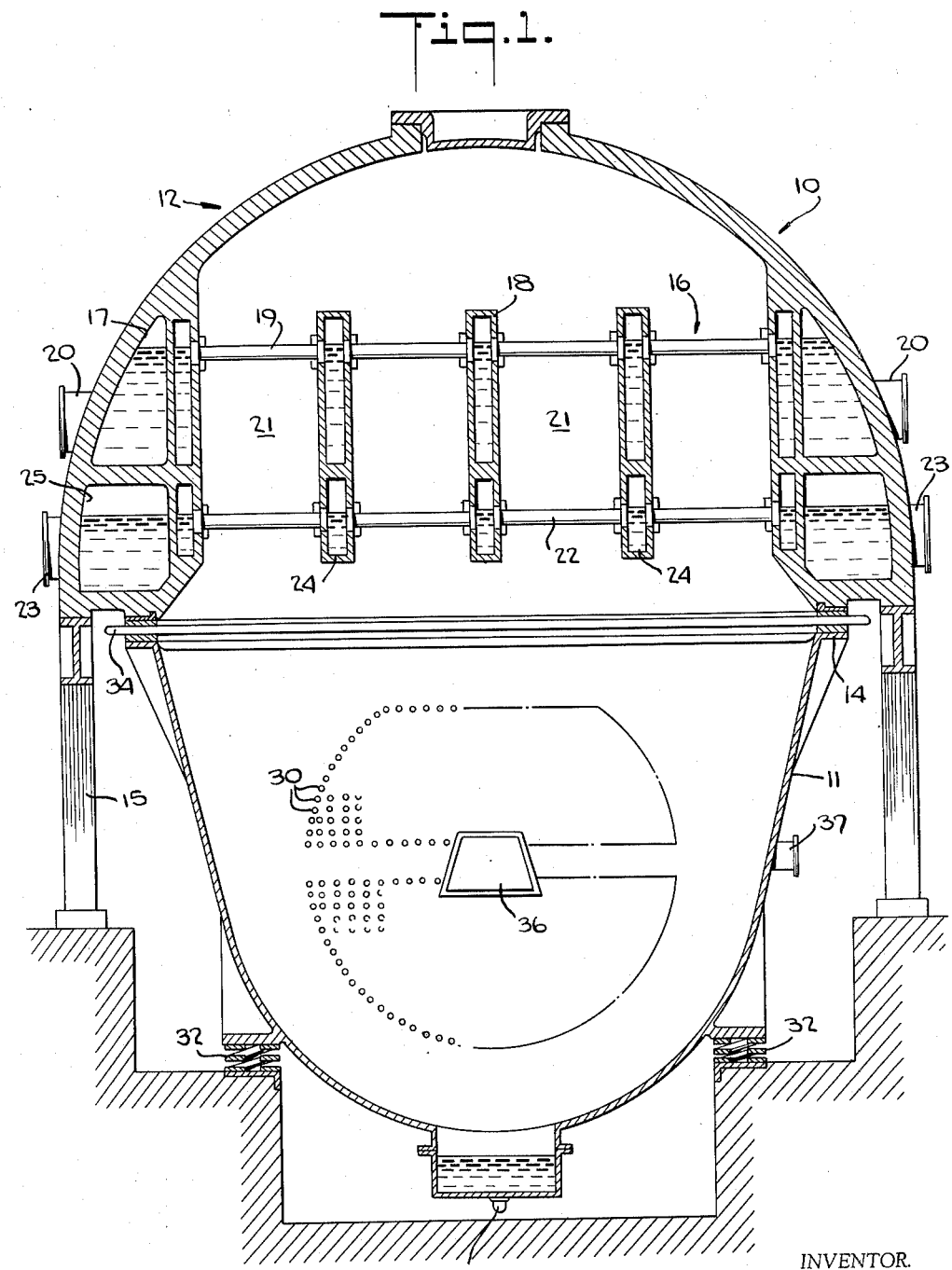
FIG. 1 is an elevational sectional view of a single stage system according to my present invention.

Referring now to the drawings, and more particularly to FIG. 1 thereof, there is shown an upper inverted cup-shaped concrete shell portion 10 the lowermost edges of which merge with a lower steel condenser shell 11 so that the two cooperate to form an enclosure 12. Actually, the lower periphery of the shell 10 rests on and is sealed to an outwardly extending flange 14 constituting an integral part of the condenser shell. Upright columns 15 may be provided to add support to the shell, as shown. A tower 16 of the type before referred to as being shown and described in U.S. Letters Patent No. 2,760,764 is positioned within the shell portion 10 of the enclosure and, may in fact be integral therewith.

The tower 16 has a closed endless main trough 17, intermediate troughs 18 in communication therewith, and a number of closely spaced distributing channels 19 in communication with the intermediate troughs. The main trough receives heated saline water from one or more conduits 20, which water flows to the intermediate troughs and to the distributing channels from which it overflows and runs down along the sides thereof and thence down the sides of film plates 21 therebeneath, thus being presented to the spaces between the plates in thin film dis position.

Each tower has collecting troughs 22 positioned one each beneath and coextensive with the film plates for collecting water that reaches the lower region of the respective plates. These collecting troughs are in fluid flow communication with intermediate return troughs 24 that in turn communicate with an endless return trough 25 through which the unevaporated, cooled saline water is delivered to one or more exhaust conduits 23. The tower as thus far described is known, and a more detailed description of the construction and operation thereof will, of course, be found in the aforementioned patent, but I have here presented the foregoing brief description thereof to assist in an understanding of my present concept.

If recompression is to be effected, I may utilize a diffuser 28 between the shell portion 10 and the condenser shell 11, this diffuser actually constituting an outwardly and downwardly flared part integral with the shell 10, as shown in FIG. 1; or I may so shape the collecting troughs 22 that their cross-sections are V-shaped and their height sufficient to form a diffuser of proper angle.

As has already been stated, I provide vapor channel means adjacent each film surface in which the vapor may flow away from the water surface to the condenser. Thus, FIG. 2 illustrates one form of my invention according to which I insert between each pair of film plates 21 a plug or channel plate 29 to create a channel adjacent each film surface. Each such channel plate is substantially coextensive vertically and horizontally with its adjacent film plates and may be dimensioned to provide channels of any desired width or variation in width, about which more will be said later.

According to the embodiment illustrated in FIGS. 5 and 6, a plug of the type already referred to and indicated by the reference numeral 29 is not used; but instead, the vapor channels are formed by tapering the opposing surfaces of film plates 21 so that the plates are in effect somewhat V-shaped and opposing surfaces diverge downwardly. Actually, of course, the plates may be inclined as desired to provide channels of any desired characteristics.

Any suitable condensing means may be used but for purposes of illustration, the condenser that I have shown may include a number of tubes 30 spaced inwardly of the shell 11. It will be seen that the shell is supported by springs 32 and that an expansion joint 34 between the shell and the evaporator permits free movement of the shell due to temperature variations, all in accordance with methods of condenser support known in the art. The condenser is also equipped with a mechanically driven air pump 36 discharging through a line 37 provided for the purpose.

In operation, saline water to be converted is pumped from its source, such as the sea, is heated by any convenient means (not shown) and is delivered to the main trough 17 of tower 16 through the conduits 20. The heat source may in fact comprise a power condenser whereby the otherwise wasted heat rejected from the condenser of a steam power plant is utilized. The water then flows through the intermediate troughs 18 into the distributing channels 19 to overflow therefrom and to run down the sides of the film plates 21 in thin film attitude. The imposed pressure differential between the saturation pressure of the incoming warm water and the condenser pressure is gradually reduced by the vapor flow in the channels adjacent to each water film, so that at each point in the channel there is substantial balance between the saturation pressure corresponding to the water temperature and the vapor pressure, as the temperature of the water film is reduced from its inlet to its outlet temperature through vaporization. The vapor moves through the vapor channels towards the condenser where it is condensed into fresh water, is collected at the bottom of the condenser and delivered by the condensate pump 35, for example, to a desired location. The remaining saline water reaches the collecting troughs 22 and flows to intermediate troughs 24, endless return trough 25 and back to the source through exhaust conduits 23. The air pump 36 discharges noncondensibles from the enclosure 12.

As has been stated, one of the fundamental concepts of the present invention demands the creation of vapor channels within each of which there is maintained at each point a substantial balance between the saturation pressure corresponding to the temperature of the water, and the vapor pressure at that point.

This balance can be maintained with a variety of velocities of vapor release and velocities of vapor through the channels, it being necessary to adjust the channel dimensions depending upon these velocities. In addition to these factors, a proper system must also maintain sufficiently thin water films over the plates, this factor being controlled by the velocity of water in the distributing channels. Actually, the velocity of the water must be such that sufficient water flows on the plates to provide enough vapor to fill the channels thus producing an absolute pressure substantially equal to the saturation pressure of the water at any given point on the water film. Too low a velocity will give rise to objectionable violent flashing; while too high a velocity will cause layers of water to tumble down the plates causing splashing and possibly bridging of the water across the channels.

Figure 3:
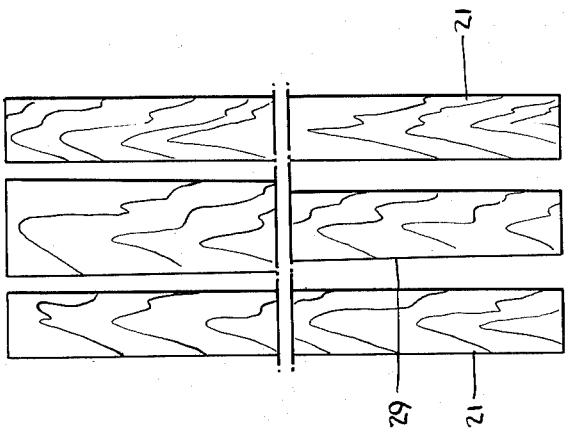
FIG. 3 is an end view partly broken away, of a pair of film plates with a plug therebetween.

All of these variables are mathematically interrelated and the selection of one necessarily fixes the others. Thus, for example, if a very small vapor release velocity is selected, this will require a large surface and will result automatically in thin water films, low water velocities in the distributing channels and low vapor velocities in the vapor channels. The appropriate dimensions of the vapor channels are then mathematically determined. Accordingly, it will be appreciated that existing critical conditions in each case will determine the required surface area of the film plates and this in turn will determine the vapor channel dimensions necessary for a balanced pressure condition as outlined hereinbefore. Since the volume of vapor at the top or beginning of the channel is substantially zero and the vapor is formed continuously over the entire surface of the film plates, it will be desirable to taper the channels so that they widen in the downward direction as shown in FIGS. 3 and 6, for example. In this connection, it will be understood that the channels may under certain conditions also be designed as nozzles for the creation of high vapor velocities to be subsequently compressed in a diffuser which may be interposed between the evaporator and condenser.

Depending on the total available temperature differential between the incoming hot water and the cooling water, the application of the present inventive concept to an actual system may be in the form of a single effect or it may consist of a number of individual effects, with each effect absorbing a fraction of the total temperature differential.

A multi-stage system requires a single flow arrangement in which the ocean water is pumped in series through the vapor condenser of each stage, there absorbing the heat of condensation of each stage, thence through the heat source, a power condenser for example, where the heat necessary to cover all the losses of the system is taken on, and then continuing in series as feed water through the evaporator tower of each stage, where by successive vaporization its temperature is reduced to the final temperature of discharge back into the ocean.

In a single effect system, the single flow arrangement can still be employed. But it is equally possible to separate the cooling water stream through the vapor condenser from the feed water stream through the evaporator towers by employing a double flow arrangement. Cooling water from the ocean is a "once-through" system, is pumped through the vapor condenser, where it absorbs the heat of condensation and is then discharged back into the ocean. The independent feed water stream recirculates in a closed cycle between the heat source where heat is absorbed, and the evaporator, where heat is given up by evaporation.

By way of example, for a single effect application with single flow arrangement, and assuming an ocean temperature of 55° F. this water may be pumped first through the tubes 30 of the vapor condenser and, by condensing vapor from tower 16, its temperature may be raised to 70° F. It then continues to flow through the heat source, a power condenser for example, where its temperature may be raised to 90° F. It then is delivered to the main trough 17 of the evaporator tower 16, through the conduits 20, and flows through the intermediate troughs 18 and the distributing channels 19 to overflow the film plates 21 and to form vapor in the adjacent channels. The water, cooled to 75° F. is collected in the troughs 22 and flows through the intermediate troughs 24 into the main trough 25, from where it is discharged through conduit 23 back into the ocean. By way of example, for a single effect application with separate cooling and feed water streams, and again assuming an ocean temperature of 55° F., this cooling water is pumped through the tubes 30 of the vapor condenser where it condenses the vapor coming from tower 16 and is discharged with a temperature of 70° F.

The independent feed water steam recirculates in a closed cycle between the evaporator tower 16 and the heat source, the power condenser for example. Thus this circulating water may leave the power condenser at a temperature of 90° F. It then is delivered to the main trough 17 of the evaporator tower 16 through conduit 20 and flows through the intermediate troughs 18 and the distributing channels 19 to overflow the film plates 21 and to form vapor in the adjacent channels. Cooled to 75° F. the water is then collected in the channels 22 and flows through the intermediate troughs 24 into the main trough 25, from where it is returned through conduit 23 to the power condenser to continue the cycle.

To maintain a suitable salinity in the recycling water, provisions (not shown) are made to withdraw a quantity from the cycle as "blowdown" and to replace it by fresh ocean water as "make-up."

Figure 4:
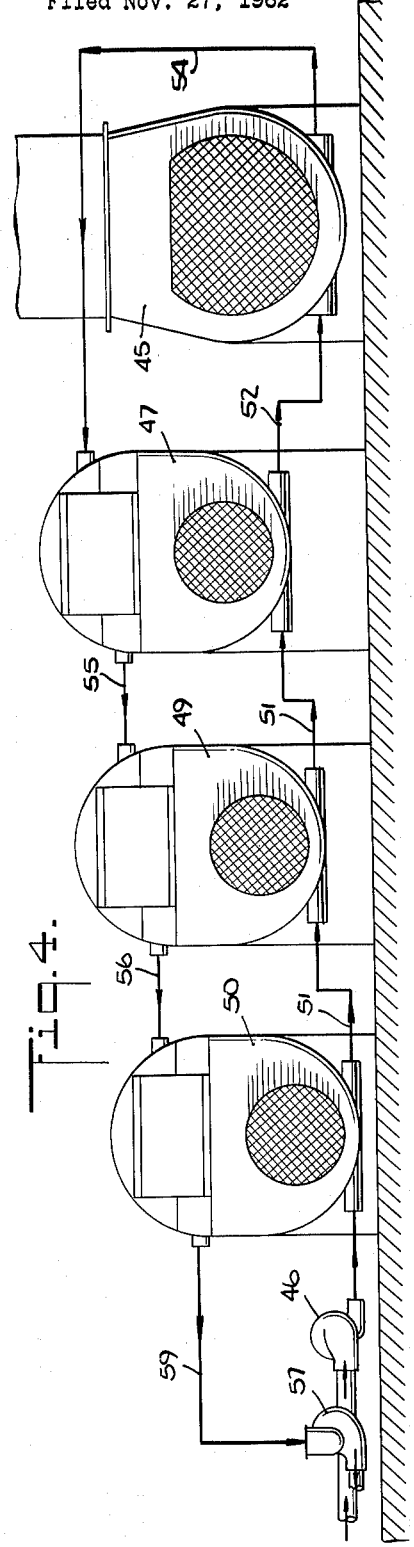
FIG. 4 is a schematic view of a multi-stage system in accordance with the invention.

Turning now to FIG. 4, there is shown a multistage system wherein a steam power condenser 45 is illustrated as the heat source, although it will be appreciated that any suitable heat source may be employed. Actually, a three effect system has been selected for present purposes.

By way of example of the multi-stage system illustrated in FIG. 4, a circulating pump 46 pumps the sea water in series through the three vapor condensers 47, 49 and 50 (the water actually reaching the condensers in inverse order) through lines 51. The sea water may enter vapor condenser 50 at say 55° F. and leave at 65° F. while serving to condense the vapor therein. It continues through condenser 49 where its temperature is raised to 75° F. and finally through condenser 47 where its temperature is raised to 85° F.

From vapor condenser 47, the sea water is conducted through pipe 52 to the heat source 45 where its temperature may be raised to 100° F. as it absorbs the available heat load from the turbine steam. From the heat source 45 the water is conveyed through pipe 54 to the tower of first stage 47 where it is cooled from 100° F. to say 90° F. as it gives up a quantity of vapor which is condensed to afford a portion of the system product. Upon leaving this stage, the water passes through pipe 55 to the tower of the second stage 49 where it is further cooled to 80° F. as it gives up additional vapor for condensation. Finally, it passes through pipe 56 to the tower of the last stage 50 where it is cooled to 70° F. giving up still more vapor, and is then returned to the ocean.

Referring again to FIG. 4, it is evident that the total head required for pumping the sea water through the system consists of the sum total of all pressure losses of the system plus the sum of the pumping heads of all the towers. This pumping is accomplished by the use of pump 46 which supplies the excess head over the available atmospheric pressure differential caused by pressure losses in the condensers and the static head of the power condenser, where that source of heat is used. Thereafter, by placing the evaporators at differential levels, flow proceeds by gravity, or a second pump 57 may discharge the water from the vacuum side of the last stage, through pipe 59, into the ocean.

From the foregoing description it will be seen that I have conceived a novel and economical solvent recovery system which may be applied to the conversion of saline water to potable fresh water by utilizing controlled vapor diffusion without the violent and unstable effects of flashing and the accompanying disadvantages and difficulties.

I believe that the construction and operation of my novel conversion system will now be understood, and that the advantages of my invention will be fully appreciated by those persons skilled in the art.

I now claim:

1. In a recovery system of the class described, means defining a closed elongated channel, means arranged to supply preheated liquid to the upper end of said channel, said channel being constructed to direct the preheated liquid supplied thereto to pass downwardly through the channel in falling film configuration along with vapors formed from the falling liquid inside said channel, said channel being arranged to be substantially free from heating and cooling means other than said liquid and vapors, means operative to maintain the pressure at the upper end of said channel close to the saturation pressure of the heated liquid supplied thereto, and further means operative to maintain the liquid at the lower end of said channel at a pressure substantially lower than said saturation pressure, whereby a portion of the downwardly flowing liquid evaporates along the inside of said channel while obtaining heat of vaporization from the liquid adjacent thereto and causing a temperature gradient which decreases toward the lower end of said channel, the lower pressure maintained at the lower end of said channel being effective to cause rapid downward movement of said vapors without condensation thereof within said channel such that said moving vapors maintain an evenly distributed pressure gradient which is related to the temperature gradient along said channel, to maintain the flowing liquid at near saturation conditions for continuous and non-violent evaporation therefrom along the channel.

2. In a recovery system of the class described, a housing, film plate means in said housing presenting vertical surfaces for disposing in thin film attitude liquid supplied thereto, means adjacent said surfaces cooperating therewith to form closed elongated channel means therebetween, means arranged to supply preheated liquid to the upper end of said channel means, said channel means being constructed to direct the preheated liquid supplied thereto to pass downwardly therethrough in falling film configuration along with vapors formed from the falling liquid inside, said channel means being arranged to be substantially free of heating and cooling means other than said liquid and vapors, means operative to maintain the pressure at the upper end of said channel means close to the saturation pressure of the heated liquid supplied thereto, means disposed below said vertical surfaces for collecting unevaporated liquid and directing same along a given path, and further means operative to maintain the pressure at the lower end of said channel means at a value substantially lower than said saturating pressure, whereby a portion of the downwardly flowing liquid evaporates along the inside of said channel means while obtaining heat of vaporization from the liquid adjacent thereto and causing a decreasing temperature gradient down said channel means, the lower pressure maintained at the lower end of said channel means being effective to cause rapid downward movement of said vapors without condensation thereof within said channel means such that said moving vapors maintain an evenly distributed pressure gradient which is related to the temperature gradient along said channel means, to maintain the flowing liquid at near saturation conditions for continuous and non-violent evaporation therefrom along the channel.

3. In a recovery system of the class described comprising a housing, a series of spaced film plate means in said housing presenting vertical surfaces for disposing in thin film attitude liquid supplied thereto, said film plate means forming the walls of closed elongated channels, means arranged to supply preheated liquid to the upper end of each of said channels, said channels being constructed to direct the preheated liquids supplied thereto to pass downwardly through the channels in falling film configuration along with vapors formed from the falling liquid inside said channels, said channel walls being substantially free from heating and cooling means other than said liquid and vapors, means operative to maintain the pressure at the upper end of each of said channels close to the saturation pressure of the heated liquid supplied thereto, means disposed below each of said film plate means for separating vapors at the lower end of said channels from unevaporated liquid and for collecting said unevaporated liquid, further means operative to maintain the pressure at the lower end of said channels at a substantially lower value, said further means including means for condensing said vapors, whereby a portion of the downwardly flowing liquid evaporates along the inside of each channel while obtaining heat of vaporization from the liquid adjacent thereto and causing a decreasing temperature gradient down said channels, the lower pressure maintained at the lower end of said channels being effective to cause rapid downward movement of said vapors without condensation thereof within said channels such that said moving vapors maintain an evenly distributed pressure gradient which is related to the temperature gradient along the channels, to maintain the flowing liquid at near saturation conditions for continuous and non-violent evaporation therefrom along the channel.

4. In a recovery system of the class described, a housing, a series of spaced film plate means in said housing presenting vertical surfaces for the disposing of thin film attitude liquid supplied thereto, means arranged to supply preheated liquid to said surfaces at a rate to enable same to flow down along said surfaces in thin film attitude, channel plate means positioned between adjacent film plate surfaces and so shaped relatively thereto as to form therewith closed elongated channels, said channels being constructed to direct preheated liquid supplied thereto to pass downwardly therethrough in falling film configuration along with vapors formed from the falling liquid inside the channels, the walls of said channels being arranged to be substantially free from heating and cooling means other than said liquid and vapors, means operative to maintain the pressure at the upper end of said channels close to the saturation pressure of the liquid supplied thereto, means disposed below said plate means collecting unevaporated liquid reaching the bottom of said plates through said channels, and further means operative to maintain the pressure at the lower end of the channels at a value substantially lower than said saturation pressure, said further means including means for condensing said vapors, whereby a portion of the downwardly flowing liquid is caused to evaporate along the inside of each channel while obtaining heat of vaporization from the liquid immediately adjacent thereto so as to cause a decreasing temperature gradient down said channels, the lower pressure maintained at the lower end of said channels being effective to cause rapid downward movement of said vapors therethrough without condensation of said vapors within said channels such that said moving vapors maintain an evenly distributed pressure gradient which is related to the temperature gradient along said channels, to maintain the flowing liquid at near saturation conditions for continuous and non-violent evaporation therefrom along the channel.

5. In a recovery system of the class described, the combination comprising liquid supply means, a plurality of parallel distributing channels in fluid flow communication with said supply means, a film plate vertically positioned beneath each distributing channel and providing surfaces for disposing in thin film attitude liquid supplied to the channels by said supply means and overflowing same, means providing a surface adjacent each of said first mentioned surfaces to define in cooperation therewith closed elongated channels, said channels being constructed to direct liquid supplied thereto to pass downwardly therethrough in falling film configuration along with vapors formed from the falling liquid inside the channels, said channels being arranged to be substantially free from heating or cooling means other than said liquid and vapors, means operative to maintain the pressure of the upper end of each of said channels close to the saturation pressure of the liquid supplied thereto, and further means operative to maintain the pressure at the lower end of said channels at a value substantially lower than said saturation pressure, whereby a portion of the downwardly flowing liquid evaporates along the inside of said channels while obtaining heat of vaporization from the liquid immediately adjacent thereto so as to cause a decreasing temperature gradient down said channels, the lower pressure maintained at the lower end of said channels being effective to cause rapid downward movement of said vapors without condensation thereof within said channels such that said moving vapors maintain an evenly distributed pressure gradient which is related to the temperature gradient along said channels, to maintain the flowing liquid at near saturation conditions for continuous and non-violent evaporation therefrom along the channel.

6. In a recovery system of the class described, the combination comprising, liquid supply means, a plurality of parallel distributing channels in fluid flow communication with said supply means, a film plate positioned vertically beneath each distributing channel and providing surfaces for disposing in thin film attitude liquid supply to said channels via said supply means and overflowing same, means providing a surface adjacent each of said first mentioned surfaces and angulated relatively thereto to provide therewith a closed elongated vapor channel, said vapor channel being constructed to direct liquid supplied thereto to pass downwardly therethrough in falling film configuration along with vapors formed from the falling liquid inside said vapor channel, the walls of said vapor channel being substantially free from heating or cooling means other than said liquid and the vapors formed therefrom, means operative to maintain the pressure at the upper end of said vapor channels close to the saturation pressure of the heated liquid supplied thereto, and further means operative to maintain the pressure at the lower end of said vapor channels at a value substantially lower than said saturation pressure, whereby a portion of the downwardly flowing liquid evaporates along the inside of said vapor channels while obtaining heat of vaporization from the liquid immediately adjacent thereto and causing a decreasing temperature gradient down said vapor channels, the lower pressure maintained at the lower end of said vapor channels being effective to cause rapid downward movement of said vapors without condensation thereof within said vapor channels such that said moving vapors maintain an evenly distributed pressure gradient which is related to the temperature gradient along said vapor channels, to maintain the flowing liquid at near saturation conditions for continuous and non-violent evaporation therefrom along the channel.

7. A recovery system as in claim 6 wherein said vapor channels are so shaped in cross-section as to allow the flow of vapor therethrough in accordance with a preselected velocity function.

8. In a recovery system of the class described the combination comprising, means for continuously supplying preheated liquid, a plurality of parallel distributing channels in fluid flow communication with said supply means, a film plate vertically positioned beneath each distributing channel and providing surfaces for disposing in thin film attitude liquid supply to said channels by said supply means and overflowing same, means providing a surface adjacent said first mentioned surfaces and angulated relatively thereto to provide therewith an enclosed elongated vapor channel, said vapor channel being constructed to direct preheated liquid supplied thereto to pass downwardly therethrough in flowing film configuration along with vapors formed from the falling liquid inside said vapor channels, the walls of said vapor channels being substantially free from heating or cooling means other than said liquid and vapors, means operative to maintain the pressure at the upper end of said vapor channels close to the saturation pressure of the heated liquid supplied thereto, further means operative to maintain the pressure at the lower end of said vapor channels at a value substantially lower than said saturation pressure, said further means including means for condensing the vapor from said vapor channels, said vapor channels further being so shaped in cross section as to allow the flow of vapor therethrough at a velocity such that the vapor leaves said vapor channels at the same mass rate at which it is supplied thereto whereby a portion of the downwardly flowing liquid evaporates along the inside of each of said vapor channels while obtaining heat of vaporization from the liquid immediately adjacent thereto and causes a decreasing temperature gradient down said vapor channels, the lower pressure maintained at the lower end of said vapor channels being effective to cause rapid downward movement of said vapors without condensation thereof within said vapor channels such that said moving vapors maintain an evenly distributed pressure gradient which is related to the temperature gradient along said vapor channels, to maintain the flowing liquid at near saturation conditions for continuous and non-violent evaporation therefrom along the channel.

9. In a recovery system of the class described, the combination comprising, means heating saline liquid to be converted to potable fresh water, a plurality of parallel distributing channels in fluid flow communication with said heating means, a film plate vertically positioned beneath each distributing channel and providing surfaces for disposing in thin film attitude liquid supplied to said channels by said supply means and overflowing same, means providing a surface adjacent each of said first mentioned surfaces and angulated relatively thereto to provide therewith a vapor channel for conducting vapor from said films, the walls of said vapor channels being substantially free from heating or cooling means other than the liquid and vapors falling therethrough, means operative to maintain the pressure at the upper end of said vapor channels close to the saturation pressure of the heated liquid supplied thereto, means disposing below said plate means collecting the unevaporated liquid reaching the bottom of said plates, further means operative to maintain the pressure at the lower end of said channels at a value substantially lower than said saturation pressure, said further means including means condensing the vapor from said vapor channels, whereby a portion of the downwardly flowing liquid evaporates along the inside of each of said channels while obtaining heat of vaporization from the liquid immediately adjacent thereto so as to cause a decreasing temperature gradient down the length of said channels, the lower pressure maintained at the lower end of said channels being effective to cause rapid downward movement of said vapors without condensation thereof in said channels such that said moving vapors maintain an evenly distributed pressure gradient which is related to the temperature gradient along said channels, to maintain the flowing liquid at near saturation conditions for continuous and non-violent evaporation therefrom along the channel.

10. A method for extracting solvent from a liquid containing a dissolved non-volatile substance comprising heating the liquid, thereafter causing the heated liquid to flow downwardly in falling film configuration through an elongated enclosed evaporation channel while maintaining said channel free of heating and cooling means other than said heated liquid, maintaining the pressure of the liquid at the upper end of the channel close to its saturation pressure and maintaining the pressure at the lower end of the channel at a substantially lower pressure, said lower pressure being effective to cause vaporization within the channel with a consequent decreasing temperature gradient therealong, the heat of such vaporization being taken from the unevaporated portion of the downwardly flowing liquid, said lower pressure also serving to cause rapid movement of vapor down through said channel without condensation within said channel, such rapid downward movement of vapor serving to maintain an evenly distributed pressure gradient which is related to the temperature gradient along said channel, to maintain the flowing liquid at near saturation conditions for continuous and non-violent evaporation therefrom along the channel.

11. A method of recovering solvent from a liquid containing a dissolved non-volatile substance comprising: heating the liquid, thereafter causing the heated liquid to flow downwardly in falling film configuration through an elongated enclosed evaporation channel while maintaining said evaporation channel free of heating and cooling means other than said heated liquid, maintaining the pressure of the liquid at the upper end of the channel close to its saturation pressure, maintaining the pressure at the lower end of said channel at a substantially lower pressure, said lower pressure being effective to cause vaporization within said channel with a consequent decreasing temperature gradient therealong, the heat of such vaporization being extracted from the immediately adjacent portion of the unevaporated downwardly flowing liquid in the channel, said lower pressure also serving to cause rapid movement of vapor down through said channel without condensation within said channel, such rapid downward movement of vapor serving to maintain an evenly distributed pressure gradient which is related to the temperature gradient along said channel, to maintain the flowing liquid at near saturation conditions for continuous and non-violent evaporation therefrom along the channel, inducing the flow of said vapor from said evaporation channels through condensing means, condensing the vapor thus formed and collecting the condensate.

12. A method of converting saline water to potable fresh water comprising heating the saline water to be converted, thereafter causing the heated saline water to flow downwardly in falling film configuration through an elongated enclosed evaporation channel while maintaining said evaporation channel free of heating and cooling means other than said heated saline water, maintaining the heated saline water at the upper end of the channel at a pressure close to its saturation pressure and maintaining the pressure at the lower end of said channel at a substantially lower pressure, said lower pressure being effective to cause vaporization within said channel with a consequent decreasing temperature gradient therealong, the heat of such vaporization being absorbed from the unevaporated water within the channel, said lower pressure further being effective to cause rapid movement of vapor down through said channel without their becoming condensed within said channel, such rapid downward movement of vapor serving to maintain an evenly distributed pressure gradient which is related to the temperature gradient along said channel, to maintain the flowing liquid at near saturation conditions for continuous and non-violent evaporation therefrom along the channel, inducing the flow of said vapor from said channels to condensing means, condensing the vapor thus formed, collecting the condensate, collecting the remaining saline water, and recirculating same for additional conversion.

13. A method according to claim 12, wherein the remaining unevaporated saline water is recirculated through the system and the salinity of same is maintained within a selected range.

14. A method according to claim 12, wherein the saline water prior to said heating is utilized as the condensing medium so as to be at least partially heated by absorption of the heat of condensation.

15. A method of converting saline water to potable fresh water comprising heating saline water to be converted, thereafter causing the heated saline water to flow downwardly in falling film configuration through an enclosed elongated evaporation channel while maintaining said channel free of heating and cooling means other than said heated saline water, maintaining the pressure on the heated saline water at the upper end of the channel close to its saturation pressure and maintaining the pressure at the lower end of said channel at a substantially lower pressure, said lower pressure being effected to cause vaporization within said channel with a consequent decreasing temperature gradient therealong, the heat of such vaporization being absorbed from the unevaporated water in the channel, said lower pressure further serving to cause rapid movement of vapor down through said channel without their becoming condensed within said channel, such rapid downward movement of vapor further serving to maintain an evenly distributed pressure gradient which is related to the temperature gradient along said channel, to maintain the flowing liquid at near saturation conditions for continuous and non-violent evaporation therefrom along the channel, condensing the vapors which proceed from the lower end of said channel, collecting the condensate, collecting the water remaining in liquid form, and circulating the water thus collected through one or more similar stages.

16. The method according to claim 15 further characterized in that the heating step is accomplished at least partially by circulating the saline water in series through the condensers of each stage as the condensing medium therefor.

17. In a multi-stage recovery system of the class described, means for heating saline water to be converted, a first stage including a housing, means for directing the so heated saline water to flow continuously through said housing, said directing means including means within said housing defining enclosed elongated vapor channels arranged to permit said saline water to flow downwardly therethrough in falling film configuration, the walls of said vapor channels being substantially free from heating and cooling means other than the saline water supplied thereto, means operative to maintain the pressure at the upper end of said channels close to the saturation pressure of the heated saline water supplied thereto, further means operative to maintain the saline water at the lower end of said channels at a substantially lower pressure, whereby a portion of the downwardly flowing saline water evaporates along the inside of said channel while obtaining heat of vaporization by extracting it from the immediately adjacent liquid portion, such heat extraction causing a temperature gradient which decreases toward the lower end of said channels, the lower pressure maintained at the lower end of said channels being effective to cause rapid downward movement of vapor without condensation thereof within said channels such that the rapidly moving vapor maintains an evenly distributed pressure gradient which is related to the temperature gradient along said channels, to maintain the flowing liquid at near saturation conditions for continuous and non-violent evaporation therefrom along the channel, means for collecting the unevaporated saline water which proceeds from the lower end of said channels, a further stage similar to said first stage, and means delivering said collected water to said further stage for similar disposition therein.

18. In a multi-stage recovery system of the class described, means for heating saline water to be converted, a first stage including a housing, means within said housing defining at least one enclosed elongated evaporation channel, means also within said housing for supplying the heated saline water to the upper end of said channel to flow downwardly therethrough in falling film configuration along with vapors formed from the falling liquid inside said channel, the walls of said channel being substantially free from heating and cooling means other than said liquid and vapor, means operative to maintain the pressure at the upper end of said channel close to the saturation pressure of the heated saline water supplied thereto, further means operative to maintain the lower end of said channel at a substantially lower pressure, whereby a portion of the downwardly flowing liquid evaporates along the inside of said channel while obtaining heat of vaporization by extracting it from the immediately adjacent liquid portion, such heat extraction causing a temperature gradient which decreases toward the lower end of said channel, the lower pressure maintained at the lower end of said channel being effected to cause rapid downward movement of vapor without condensation thereof within said channel such that said moving vapor maintains an evenly distributed pressure gradient which is related to the temperature gradient along said channel, to maintain the flowing liquid at near saturation conditions for continuous and non-violent evaporation therefrom along the channel, said further means including means condensing the vapor from said vapor channel and collecting the condensate thus formed, means for collecting the unevaporated saline water which proceeds from the lower end of said channel, at least one further stage similar to said first stage, and means delivering the collected saline water in series to said further stages for similar disposition therein, and means in advance of said heating means for directing saline water through the condensing means of each stage whereby the saline water comprises at least in part the heat load in each such condensing means.

19. In a recovery system of the class described, the combination comprising a condenser, means conveying water through said condenser to serve as a condensing medium while absorbing the heat of condensation therein and thence to discharge, a housing, means within said housing defining enclosed elongated evaporation channels, means arranged to supply condensing medium water from said condenser to the upper end of said channels, said evaporation channels being constructed to direct the water supplied thereto to pass downwardly therethrough in falling film configuration along with vapors formed from said falling water inside said channels, said evaporation channels being substantially free from heating and cooling means other than said water and vapors, means operative to maintain the pressure at the upper end of said channels close to the saturation pressure of the heated water supplied thereto and further means operative to maintain the water at the lower end of said channels at a substantially lower pressure, whereby a portion of the downwardly flowing water evaporates along the inside of said channels while obtaining heat of vaporization from the liquid immediately adjacent thereto and causing a temperature gradient which decreases toward the lower end of said channels, the lower pressure maintained at the lower end of said channels being effective to cause rapid downward movement of said vapors without condensation thereof within said channels such that said moving vapors maintain an evenly distributed pressure gradient which is related to the temperature gradient along said channels, to maintain the flowing liquid at near saturation conditions for continuous and non-violent evaporation therefrom along the channel, said further means including condenser means for condensing the thus formed vapors to the liquid state, means collecting the liquid thus formed and means recirculating the unevaporated water from said channels through the system.

20. In a recovery system of the class described, the combination comprising a condenser, means for conveying water through said condenser to serve as a condensing medium while absorbing heat of condensation therein and thence to discharge, a housing, means within said housing defining enclosed elongated evaporation channels, means arranged within said housing to supply the water from said condenser to the upper ends of said channels, said evaporation channels being constructed to direct the so heated water supplied thereto to pass downwardly therethrough in falling film configuration along with the vapors formed from such falling water inside said channels, said channels being substantially free from heating and cooling means other than said liquid and vapors, means operative to maintain the pressure at the upper ends of said channels close to the saturation pressure of the heated water supplied thereto and further means operative to maintain the water at the lower end of said channels at a pressure substantially lower than said saturation pressure, whereby a portion of the downwardly flowing water evaporates along the inside of said channels while obtaining its entire heat of vaporization from the unevaporated liquid adjacent thereto thus causing a temperature gradient which decreases toward the lower ends of said channels, the lower pressure maintained at the lower ends of said channels being effective to cause rapid downward movement of said vapors without condensation thereof within said channels such that said moving vapors maintain an evenly distributed pressure gradient which is related to the temperature gradient along said channels, to maintain the flowing liquid at near saturation conditions for continuous and non-violent evaporation therefrom along the channel, said further means including condenser means, means conveying the vapor to said condenser means for condensation to the liquid state, means arranged to collect the liquid thus formed, means to recirculate the unevaporated water from the lower end of said channels through the system, and blow down and make up means for maintaining the salinity of the saline water within a selected range.

21. In a recovery system of the class described, a housing, means defining within said housing at least one closed elongated evaporation channel, means arranged to supply preheated liquid to the upper end of said channel, said channel being constructed to direct the preheated liquid supplied thereto to pass downwardly therethrough in falling film configuration along with vapors formed from the falling liquid inside said channel, said channel being substantially free of heating and cooling means other than said liquid and vapors, means operative to maintain the pressure at the upper end of said channel close to the saturation pressure of the heated liquid supplied thereto, and further means operative to maintain the lower end of said channel at a substantially lower pressure, whereby a portion of the downwardly flowing liquid evaporates along the inside of said channel while obtaining its entire heat of vaporization from the unevaporated liquid portion immediately adjacent thereto, such extraction of heat causing a temperature gradient which decreases toward the lower end of said channel, the lower pressure maintained at the lower end of said channel being effective to cause rapid downward movement of vapor without condensation thereof within said channels such that said moving vapor maintains an evenly distributed pressure gradient which is related to the temperature gradient along said channel, to maintain the flowing liquid at near saturation conditions for continuous and non-violent evaporation therefrom along the channel, and means arranged immediately below said vapor channels for ejecting recompression of said vapor.

22. In a recovery system of the class described, a housing, means defining within said housing at least one enclosed elongated evaporation channel, means arranged to supply preheated liquid to the upper end of said channel, said channel being constructed to direct the preheated liquid supplied thereto to pass downwardly therethrough in falling film configuration along with vapors formed from the falling liquid inside said channel, said channel being arranged to be substantially free of heating and cooling means other than said liquid and vapors, means operative to maintain the pressure at the upper end of said channel close to the saturation pressure of the heated liquid supplied thereto, and further means operative to maintain the liquid at the lower end of said channel at a substantially lower pressure, whereby a portion of the downwardly flowing liquid evaporates along the inside of said channel while obtaining its entire heat vaporization from the unevaporated liquid immediately adjacent thereto thus causing a temperature gradient which decreases toward the lower end of said channel, the lower pressure maintained at the lower end of said channel being effective to cause rapid downward movement of said vapors without condensation thereof within said channels such that said moving vapors maintain an evenly distributed pressure gradient which is related to the temperature gradient along said channel, to maintain the flowing liquid at near saturation conditions for continuous and non-violent evaporation therefrom along the channel, recompression means including means to accelerate the vapor in said channel to an increased velocity and means converting at least a portion of the velocity of said vapor to pressure, and means condensing said vapor to liquid.

23. In a recovery system of the class described the combination comprising means for heating saline liquid to be converted to potable fresh water, a plurality of parallel distributing channels in fluid flow communication with said heating means, a film plate vertically positioned in each distributing channel and providing surfaces for disposing in thin film attitude the saline liquid supplied to said distributing channels by said supply means and overflowing same, means in conjuction with said film plates defining enclosed elongated evaporation channels constructed to direct the preheated saline liquid supplied thereto to pass downwardly therethrough in falling configuration along with vapor formed from the falling liquid inside said evaporation channels, said evaporation channels being arranged to be substantially free from heating and cooling means other than said liquor and vapor, means operative to maintain the pressure at the upper end of said evaporation channels close to the saturation pressure of the heated saline liquid supplied thereto, and further means operative to maintain the lower end of said evaporation channels at a substantially lower pressure, whereby a portion of the downwardly flowing liquid evaporates along the inside of said evaporation channels while obtaining its entire heat of vaporization from the unevaporated portion of liquid immediately adjacent thereto, thus causing a temperature gradient which decreases toward the lower end of said evaporation channels, the lower pressure maintaining at the lower end of said evaporation channels being effective to cause rapid downward movement of said vapor without condensation thereof within said channels such that said moving vapor maintains an evenly distributed pressure gradient which is related to the temperature gradient along said channels, to maintain the flowing liquid at near saturation conditions for continuous and non-violent evaporation therefrom along the channel, said further means including means condensing the vapor from said evaporation channels and means preceding said condensing means for effecting recompression of said vapor.

References Cited by the Examiner

UNITED STATES PATENTS

| | | |
|---|---|---|
| 341,669 | 5/86 | Lillie. |
| 1,867,076 | 7/32 | Hughes et al. |
| 2,224,621 | 12/40 | Voorhees. |
| 2,327,846 | 4/45 | Nettel et al. _____ 202—236 |
| 2,441,361 | 5/48 | Kirgan. |
| 2,447,746 | 8/48 | Ferns et al. _____ 202—64 |
| 2,698,287 | 12/54 | Bowden et al. _____ 202—236 X |
| 2,759,882 | 8/56 | Worthen et al. |
| 2,833,644 | 5/58 | Avery. |
| 2,894,879 | 7/59 | Hickman _____ 202—236 X |
| 2,899,366 | 8/59 | Hickman _____ 202—236 X |
| 2,999,796 | 9/61 | Bromley _____ 202—236 |
| 3,099,607 | 7/63 | Lustenader et al. _____ 202—75 X |

FOREIGN PATENTS 978,977   4/51   France.

NORMAN YUDKOFF, *Primary Examiner.*